United States Patent
Paoli et al.

[15] 3,696,310
[45] Oct. 3, 1972

[54] MODE-LOCKING IN SEMICONDUCTOR LASERS

[72] Inventors: Thomas Lee Paoli, Chatham; Jose' Ellis Ripper, North Plainfield, both of N.J.

[73] Assignee: Bell Telephone Laboratories, Incorporated, Murray Hill, N.J.

[22] Filed: Oct. 1, 1970

[21] Appl. No.: 77,136

[52] U.S. Cl..................................331/94.5, 356/112
[51] Int. Cl..............................H01s 3/00, G01b 9/00
[58] Field of Search......................331/94.5; 356/112

[56] References Cited

UNITED STATES PATENTS

3,495,140   2/1970   Cornely et al............331/94.5
3,551,034   12/1970   Tournois et al.......331/94.5 X

*Primary Examiner*—Ronald L. Wibert
*Assistant Examiner*—Conrad Clark
*Attorney*—R. J. Guenther and Arthur J. Torsiglieri

[57] ABSTRACT

In order to achieve longitudinal mode-locking in a semiconductor laser, the normal dispersion of a semiconductor medium is compensated for by means of an intracavity dispersive structure, thereby causing the longitudinal mode separation frequency to be uniform. The dispersive structure may take several forms including a Gires-Tournois interferometer, a pair of spaced, parallel diffraction gratings or an acoustic diffraction grating.

22 Claims, 11 Drawing Figures

INVENTORS T.L. PAOLI
J.E. RIPPER
BY Michael J. Urbano
ATTORNEY

MODE-LOCKING IN SEMICONDUCTOR LASERS

BACKGROUND OF THE INVENTION

This invention relates to semiconductor lasers and, more particularly, to mode-locking in such lasers.

The future of the laser in optical communications systems depends to a large extent upon its usefulness as a source of an optical carrier signal. More specifically, because of the well-known noise rejection properties of digital systems, it is desirable that the laser provide a source of optical pulses which can be readily modulated (PCM) by the selective elimination of pulses in accordance with information to be transmitted. The information carrying capacity of such a system is of course directly related to the pulse width and pulse repetition rate of the carrier signal, i.e., the narrower the pulse width and the higher the repetition rate, the higher the information capacity.

In the optical field, one ready source of such a carrier signal is a mode-locked laser, i.e., a laser in which the longitudinal modes are phase-locked. The output of a mode-locked laser is a pulse train of repetition rate equal to $c/2n_aL$ where $c$ is the speed of light in a vacuum, L is the length of the laser resonator, and $n_a$ is an average index of refraction characterizing the complete laser cavity including the active medium. This type of mode-locking, which requires that the longitudinal mode separation frequency ($\Delta f$) be uniform, will hereinafter be termed conventional mode-locking.

At present, conventional mode-locking has been achieved in gaseous lasers as well as solid state (nonsemiconductor) lasers by several means including an intracavity saturable absorber (e.g., a bleachable dye) and an intracavity loss or phase modulator driven at the longitudinal mode separation frequency (i.e., synchronous modulation). These techniques typically produce pulse widths of the order of 100 picoseconds and repetition rates of about 100 MHz, the latter being limited by the length of the laser resonator (to produce sufficient gain in gaseous and solid state lasers the resonator length is typically about 10–100 cm).

In this respect, the prospect of achieving conventional mode-locking in a semiconductor laser, of the bulk or p-n junction type, is very attractive not only because the small size of the laser resonator (about 0.1 cm or less) would produce high repetition rates (about 30 GHz or more) but also because the large line width (about 300A.) of the medium would produce very short pulses (about 1 picosecond or less)—an improvement by a factor of 100 or more in the same parameters of gaseous and solid state lasers. We have discovered, however, that the high positive dispersion of semiconductor materials, which leads to a form of higher-order mode-locking (or self-induced pulsing) of the type described by us in an article entitled "Coupled Longitudinal Mode Pulsing in Semiconductor Lasers," *Phys. Rev. Let.*, 22, 1085 (1969), has prevented the achievement of conventional mode-locking.

Dispersion is a phenomenon resulting from the variation in index of refraction of a medium with optical frequency and causes radiation to experience frequency dependent time delays. Dispersion may be characterized as either positive (normal) or negative depending, respectively, on whether higher frequencies are delayed more than lower frequencies or vice versa. This phenomenon may be dramatically observed in an optical pulse containing radiation components in the visible portion of the spectrum. Positive dispersion, such as that produced by a glass rod, causes the leading edge of the pulse to be red (lower frequency, less delay) and the trailing edge to be blue (higher frequency, more delay).

In semiconductor active media this normal dispersion causes the longitudinal mode separation frequency to be nonuniform, thereby preventing the attainment of conventional mode-locking.

In solid state active media, such as Nd:glass for example, although mode-locking is attained, the lower limit on the pulse width of the pulses generated, typically about 3–20 picoseconds, is due primarily to positive dispersion in the glass rod which by delaying different frequency components by different amounts causes the pulses to "spread out" in time. The solution of this problem is the subject matter of copending application Ser. No. 77,228 of M. A. Duguay and J. W. Hansen (Case 13–3) filed concurrently herewith and assigned to applicants' assignee.

It is therefore an object of the present invention to produce conventional mode-locking in semiconductor lasers.

It is another object of this invention to produce such mode-locking in p-n junction lasers.

It is still another object of this invention to produce such mode-locking by the introduction of dispersion compensation into the resonator of a semiconductor laser.

SUMMARY OF THE INVENTION

These and other objects are accomplished in accordance with an illustrative embodiment of the invention in which the inherent dispersion of a semiconductor active laser medium is compensated for by means of an intracavity multireflection device, such as a pair of spaced, parallel diffraction gratings, an acoustic diffraction grating or a Gires-Tournois interferometer, the parameters of which are adjusted to introduce compensating dispersion, substantially equal in magnitude, but opposite in sign, to that inherent in the medium. With such compensation accomplished, conventional mode-locking is achieved, for example, by means of intracavity synchronous modulation (e.g., by synchronously modulating the injection current of a junction laser) or by means of saturable absorption inherent in the semiconductor medium itself.

BRIEF DESCRIPTION OF THE DRAWING

These and other objects of the invention, together with its various features and advantages, can be more easily understood from the following more detailed description taken in conjunction with the accompanying drawing, in which.

DETAILED DESCRIPTION

Before discussing the invention in detail, a brief discussion of two types of multireflection dispersive structures used herein will be presented.

Figure 1:
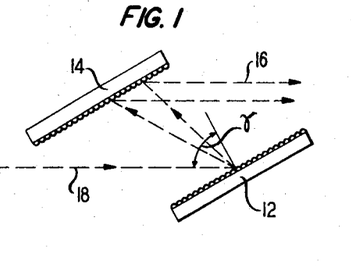
FIG. 1 is a schematic of a pair of spaced parallel diffraction gratings.

One type of dispersive structure, as shown in FIG. 1, comprises a pair of spaced, parallel, matched diffraction gratings 12 and 14 disposed so that radiation reflected from one grating is incident upon the other. In such a double grating arrangement, each frequency component follows a unique path which is determined by the diffraction conditions, the consequent variation of path length being a function of frequency. Over a relatively wide frequency band this arrangement provides a frequency dependent time delay, i.e., lower frequency components of incident radiation undergo larger diffraction angles, traverse longer paths and hence undergo longer delays, and vice versa. In addition, after being diffracted by the two identical and parallel gratings 12 and 14 the beam 16 emerges parallel to its original direction 18 but spatially separated in parallel paths. By returning the light over the same path after reflection from a mirror (see FIG. 4), the delay is doubled and the spatial separation is removed.

In such a dispersive structure, compensation for the inherent dispersion of an active medium occurs when $$b = \frac{cL}{\lambda T(\lambda)} \frac{dn_e}{d\nu_l} \quad (1)$$

where
$b$ = slant spacing of the gratings, i.e., the distance along a light ray measured between the gratings,
$L$ = length of the laser medium,
$\nu_l$ = center frequency of the laser radiation
$c$ = speed of light in a vacuum, and $n_e$ is an equivalent index of refraction given by $$n_e = n + \nu_l (dr/d\nu n/_l) \quad (2)$$

where $n$ is the index of refraction of the medium, and $T(\lambda)$ is a function of the angle of incidence of the radiation on the gratings and is given by $$T(\lambda) = \frac{\left(\frac{\lambda}{d}\right)^2}{\left[1 - \left(\frac{\lambda}{d} - \sin\gamma\right)^2\right]} \quad (3)$$

where $\gamma$ = angle of incidence between the radiation and the normal to the grating, and
$d$ = ruling spacing of the gratings.

For example, consider a grating pair each having 3,000 lines/cm ($d = 1/3,000$ cm) and an angle of incidence $\gamma = 60°$. At $\lambda = 0.95\,\mu$m, equation (3) gives $T(\lambda) = 0.13$ approximately. To compensate for dispersion $dn_e/d = 10^{-14}$ sec in a GaAs medium (see an article by D. T. F. Marple, *Journal of Applied Physics*, 35, 1241 (1964)) of length $L = 500\,\mu$m, the grating spacing from equation (1) should be $b = 1.0$ cm approximately. In order to fine tune the grating pair, a more precise value of $b$ can be experimentally determined by placing one grating on a micropositioner and adjusting $b$ for minimum light pulse width by means well known in the art.

In a similar manner, to be described hereinafter, a grating may be established acoustically within the semiconductor medium itself.

Figure 2A:
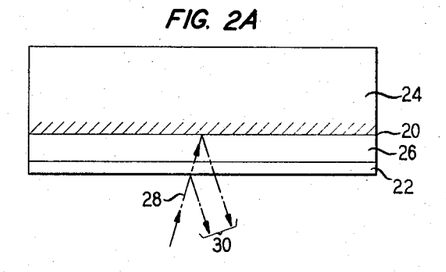
FIG. 2A is a schematic of a Gires-Tournois interferometer (GTI) in thin film form.

Another type of dispersive structure, which provides a larger time delay range than the double grating arrangement, is a short interferometer of the type described by F. Gires and P. Tournois in *Compt. Rend.*, 258, 6112 (1964), comprising (as shown in FIG. 2A) a pair of parallel mirrors or reflecting surfaces 20 and 22 of different reflectivity. A high reflectivity mirror 20, ideally 100 percent reflectivity at the center frequency of incident radiation, faces a mirror 22 of intermediate reflectivity, illustratively 25 percent which serves as an optical input-output face. In thin film form, surface 20 typically comprises a metallic or dielectric coating deposited on a substrate 24 (e.g., glass), whereas partially reflective, partially transmissive layer 22, about one quarter wavelength thick at the center frequency, is separated from surface 20 by a transparent intermediate layer 26. Layers 22 and 26 are also typically dielectrics such as thorium oxide, for example.

Figure 2B:
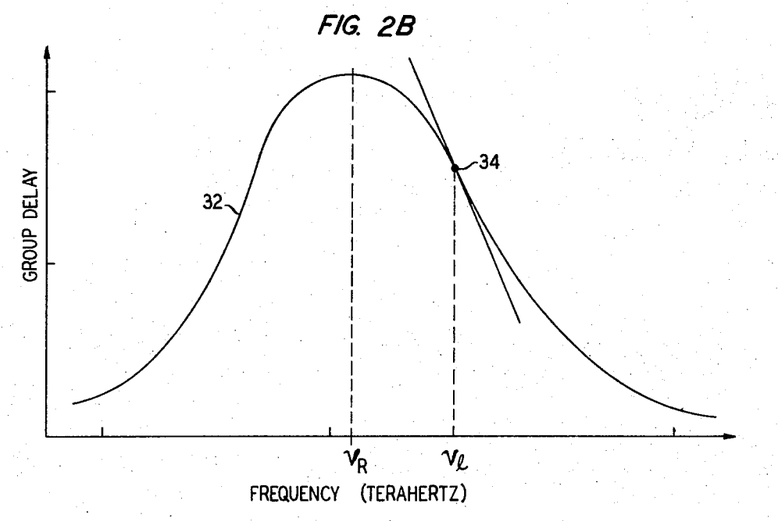
FIG. 2B is a graph of the dispersive characteristic of a GTI.

In operation, a wave 28 which impinges upon a Gires-Tournois interferometer (GTI) is partially reflected each time it strikes partially reflecting surface 22 and is substantially completely reflected each time it strikes high reflectivity surface 20. The output wave 30 is, therefore, a superposition of differently phased segments of the input wave 28; the net effect is a frequency dependent group time delay of the input wave. Overall the time delay is periodic in frequency, one period being shown in FIG. 2B. In certain restricted frequency bands (e.g., region 34 of curve 32) however, the delay is substantially linear in frequency.

The dispersion of the GTI is adjusted by varying the spacing between mirrors 20 and 22. Thus, to compensate for normal or positive dispersion in an active medium, the GTI is adjusted so that the laser center frequency $\nu_l$ falls on the high side of a GTI resonance peak shown to occur at a frequency $\nu_R$ in FIG. 2B. Such an operating point introduces negative dispersion which compensates for the positive dispersion of the active medium.

It has been found that for practical design purposes the power reflectivity of input mirror 22 should preferably be about 25 percent. Under these conditions the group delay dispersion is given by $$\frac{L}{c}\frac{dn_e}{d\nu_l} = -5\frac{f\,\text{sec}}{\text{THz}}\left(\frac{e}{2.66}\right)^2 T\nu(e) \quad (4)$$

where
$L$ = length of the active medium $c$ = speed of light in a vacuum
$\nu_l$ = optical center frequency of the laser radiation
$n_e$ = equivalent index of refraction as previously defined in equation (2)
$e$ = optical path length separating mirrors 20 and 22
$T_\nu(e)$ = tuning factor varied typically between 0.5 and 1.0 by making small (fractions of one micron) changes in $e$.

Assume, for example, it is desired to compensate for the normal dispersion of +16 fsec/THz in a 500 μm long GaAs medium ($\nu_o$ = 349 THz, $\lambda_o$ = 8600 A.). A Gires-Tournois interferometer, constructed such that $T(e)$ = 1.0 and $e$ = 4.75 μm and such that radiation undergoes normal incidence ($\lambda_R$ = 8,717 A.) on mirrors 20 and 22, produces −16 fsec/THz of negative dispersion, thereby resulting in net zero dispersion.

In order to increase the time delay, the wave by oblique incidence may be repeatedly passed through the GTI by means of a third high reflectivity mirror, the GTI may be made longer or, as will be subsequently described, a pair of oppositely facing GTI's may be utilized. For example, for oblique incidence ($\gamma$ = 30°, $\lambda_R$ = 8,658 A.) and four reflections from the GTI, a mirror separation of $e$ = 1.18 μm produces dispersion compensation of the aforementioned GaAs medium.

Figure 3A:
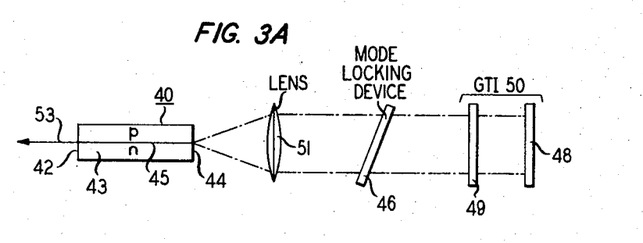
FIG. 3A is a schematic of an illustrative embodiment of the invention using a GTI.

Turning now to FIG. 3A there is shown a mode-locked semiconductor laser including an active medium 40 comprising contiguous p and n-type regions 41 and 43, respectively, forming a planar p-n junction 45 therebetween. At the end faces of the medium, and normal to the junction plane, there are cleaved (or polished) optically flat surfaces or mirrors 42 and 44. For simplicity, the means for pumping the medium 40, typically a d.c. source in forward bias connection, has been omitted. The laser resonator is formed by mirror 42 and oppositely facing, high reflectivity (ideally 100 percent reflectivity) mirror 48. Mirror 42 is partially transmissive to provide egress of an output signal 53 in the form of a pulse train while mirror 44 is ideally 100 percent transmissive (e.g., by the use of an antireflection coating thereon or by cutting the end surface at Brewster's angle) to couple radiation generated in medium 40 into the external region of the cavity between mirrors 44 and 48. For efficient coupling a lens 51 is utilized to collimate the diverging output radiation from end face 44.

In order to achieve longitudinal mode locking, there is illustratively disposed within the resonator a well known mode-locking device 46, e.g., a synchronous modulator driven at the longitudinal mode separation frequency, and, as discussed previously, a GTI 50 to compensate for the normal dispersion of medium 40 and to render uniform the longitudinal mode separation frequency. GTI 50 is shown as comprising a partially transmissive, partially reflecting input-output mirror 49 and highly reflecting mirror 48 which also is one of the mirrors of the laser resonator.

Alternatively, mode-locking may be achieved by synchronously modulating the injection current of the laser medium 40. In a preferred embodiment, however, the inherent saturable absorption of the semiconductor medium, such as GaAs at its own lasing frequencies, produces mode locking without the need for modulation. The saturable absorption of GaAs is discussed by F. Stern in *Physics of Quantum Electronics* at page 442, edited by Kelly, Lax and Tannenwald (1966), where it is indicated that the relaxation time of GaAs is about 1 nanosecond (corresponding to a repetition rate of 1 GHz and a cavity length of about 15 cm). Consequently, mode locking is readily achieved with the GaAs medium placed in an external cavity of 15 cm length, for example. Whereas a shorter cavity desirably implies higher repetition rates, it also reduces the amount of saturable absorption since the medium cannot respond completely to the higher repetition rate. However, even in the limiting case where a short internal resonator is used (i.e., a resonator formed by opposite parallel end surfaces of the medium) the amount of available saturable absorption (e.g., about 1 percent of the maximum) may be sufficient to produce mode locking.

Figures 3B, 3C, 3D:
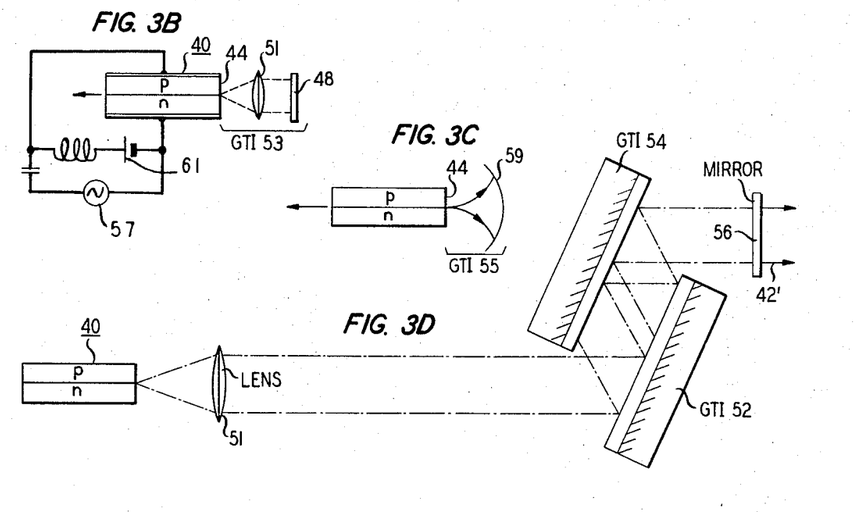
FIG. 3B is a schematic of another embodiment of the invention utilizing an end face of a laser diode as a part of a GTI.
FIG. 3C is a schematic of yet another embodiment of the invention utilizing an end face of a laser diode as a part of a GTI.
FIG. 3D is a schematic of still another embodiment of the invention using a pair of oppositely facing, parallel GTI's.

The construction of the GTI may be simplified as shown in FIGS. 3B and 3C where the end faces 44 of medium 40 form the partially reflective, partially transmissive mirror of GTI 53 (FIG. 3B) or GTI 55 (FIG. 3C), thereby eliminating the need for a separate, external mirror (i.e., mirror 49, FIG. 3A). Thus, as shown in FIG. 3B, GTI 53 comprises parallel spaced mirrors 44 and 48. Intervening lens 51 is again used to collimate the radiation emitted through mirror 44, i.e., the lens produces a plane wave-front which is matched by planar mirror 48. On the other hand, in FIG. 3C the lens is omitted and GTI 55 is formed by planar mirror 44 and concave mirror 59. Since no collimation is provided, the wavefront will not be plane and hence the curvature of mirror 59 should substantially match the shape of the wave-front as determined, for GaAs for example, by T. H. Zachos and J. C. Dyment in *IEEE J QE-6*, 317 (June 1970). For practical purposes, however, mirror 59 may be spherical with radius of curvature equal to the separation of mirrors 44 and 59.

Also shown in FIG. 3B are a d.c. source 61, illustratively a battery, and an a.c. source 57, illustratively a microwave oscillator, connected across diode 40. The battery, of course, forward biases the diode to produce current injection as is well known in the art, whereas the source 57 is a synchronous modulator utilized to produce mode locking. Such an oscillator may be also used in the embodiment of FIG. 3C, but as mentioned previously, the oscillator may be omitted entirely where the saturable absorption of the medium produces mode locking in a dispersion-compensated laser.

Where the use of a single GTI, however, provides insufficient negative dispersion to compensate for the normal dispersion of the active medium, more than one GTI may be utilized as shown in FIG. 3D. In this embodiment a pair of spaced, parallel, oppositely facing GTI's 52 and 54 are tilted at an oblique angle with respect to the resonator axis so that radiation incident on GTI 52 is reflected to incidence upon GTI 54 and thence reflected back again to GTI 52 and so on until the beam emerges to normal incidence upon mirror 56. As mentioned previously, the use of multiple reflections as well as a pair of GTI's increases substantially the amount of dispersion which can be compensated.

Figure 4:
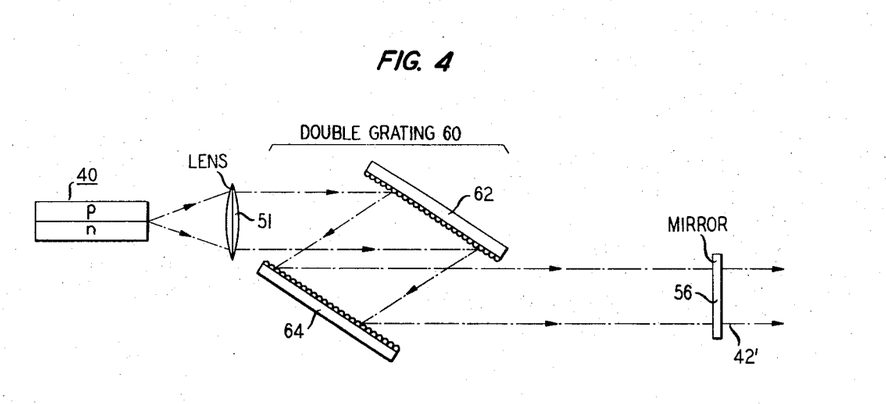
FIG. 4 is a schematic of an illustrative embodiment of the invention utilizing a pair of spaced, parallel diffraction gratings.

Alternatively, as shown in FIG. 4, a double grating 60 may be disposed within the laser resonator to provide dispersion compensation. Spaced, parallel, matched gratings 62 and 64 are disposed at an angle, typically about 60°, to incident radiation so that radiation incident upon grating 62 is reflected to incidence upon grating 64 and emerges therefrom to incidence upon mirror 56. The latter may be partially transmissive in order to couple out of the resonator an output signal 42' in the form of a mode locked pulse train.

In the foregoing embodiments of FIGS. 3A and 3D the resonator is lengthened (e.g., to 30 cm) to permit the insertion of an appropriate dispersive structure and related apparatus in the laser resonator. In doing so, however, the repetition rate of the mode locked pulse train is reduced (e.g., to 0.5 GHz) from that which is expected (e.g., 100 GHz) if mode locking took place in the short (e.g., 0.03 cm) internal resonator formed by the end faces of a semiconductor active medium.

Figure 5:
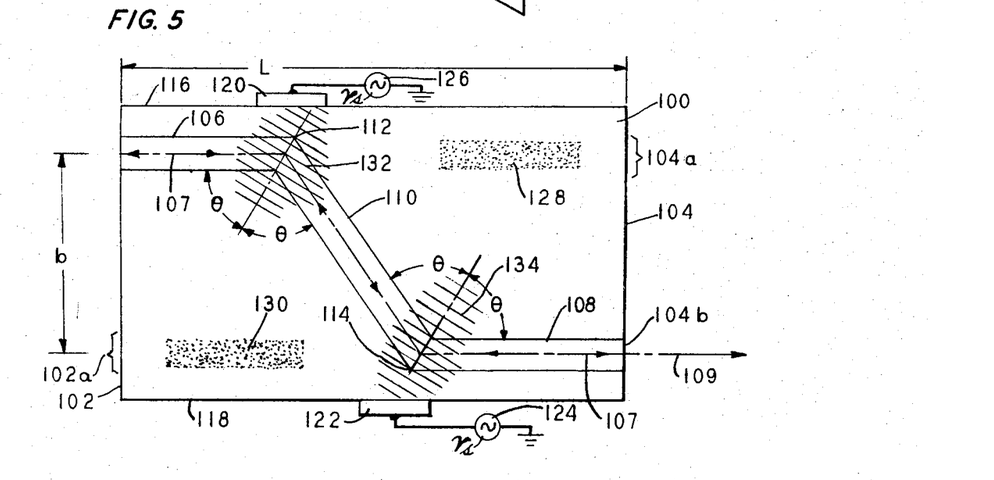
FIG. 5 is a schematic top view of an illustrative embodiment of the invention utilizing an acoustic diffraction grating in the junction plane of a laser diode.

In order to retain the advantage of high repetition rate and still attain mode locking, the embodiments of FIGS. 3B, 3C, 5, 6 or 7 may be employed. Thus, there is shown in FIG. 5 a top view of a p-n junction laser 100 having a planar junction (not shown) lying in the plane of the paper. The laser resonator is formed by cleaved (or polished) optically flat parallel end surfaces 102 and 104. On the top surface of the laser there is deposited by means well known in the art a stripe metallic contact comprising first and second segments 106 and 108 normal to end surfaces 102 and 104, respectively. These segments, which are parallel to one another and laterally spaced by a distance b, extend along only a portion of the longitudinal dimension (i.e., resonator axis) of laser 100. Connecting the segments 106 and 108 is an oblique segment 110 extending transverse thereto at an angle $2\theta$ as shown at the junctures 112 and 114. Between each juncture 112 and 114 and respective end faces 104 and 102 there are shown lossy regions 128 and 130 which create a favored (low loss) optical path including the regions under the contact segments 106, 108 and 110. Such lossy regions may be readily fabricated by longer and/or more concentrated p-type diffusion therein. Alternatively, a similar effect may be achieved by making regions 102a and 104a of end surfaces 102 and 104 of low reflectivity, e.g., by roughening these regions or by applying an antireflection coating thereto.

On each of the longitudinal sides 116 and 118, proximate to junctures 112 and 114, respectively, there are deposited acoustical transducers 120 and 122 (e.g., ZnO crystals). Connected to the transducers are a.c. signal sources 124 and 126 to produce at an angle $\theta$ to each contact segment 106 and 108 acoustic diffraction gratings 132 and 134, respectively. Alternatively, if higher acoustic losses can be tolerated, a single transducer deposited on either longitudinal surface 116 or 118 may be utilized.

In operation under forward bias conditions and with no acoustic grating established, radiation, which would normally propagate under segments 106 and 108 and between end surfaces 102 and 104, is prevented from doing so by means of the aforementioned lossy regions. However, an electric field applied to transducers 120 and 122 produces acoustic gratings 132 and 134 which cause radiation 107 under segments 106 and 108 to be reflected along the direction of transverse segment 110 in much the same manner as the grating pair previously described. Radiation 109 may illustratively be coupled out of the laser resonator by making end surface 104 partially transmissive in the region 104b adjacent to the end of segment 108. Due to the dispersion compensation thus produced, the output 109 is mode-locked either by the inherent saturable absorption of the medium or by synchronous modulation to be described later with reference to FIG. 6.

In the design of the compensated mode-locked laser of FIG. 5, the angle $\theta$ is typically chosen first in order to calculate the acoustic frequency $\nu_s$ from the following expression:

$$\nu_s = (2nc_s\nu_l\cos\theta)/c \qquad (5)$$

where
 $n =$ index of refraction of the medium
 $c_s =$ speed of sound in the medium
 $c =$ speed of light in a vacuum
 $\nu_l =$ center frequency of the laser radiation.

Thus, having determined $\nu_s$, the dispersion of the semiconductor medium is compensated for when the separation $b$ of segments 106 and 108, or the resonator length L, is chosen to satisfy approximately the following equation:

$$\frac{dn_e}{d\nu_l}\left(L+b\,\frac{\cos\theta}{\sin\theta}\right)=\frac{n^2_e b}{n\nu_l}\,\frac{\cos\theta}{\sin^3\theta} \qquad (6)$$

where $n_e$ is the equivalent index of refraction given by equation (2).

For example, assume that $\theta = 60°$ in a GaAs laser ($n = 3.6$) operating at 8,600 A. ($\nu_l = 349$ THz), then equation (5) gives $\nu_s = 15$ GHz. For L = 380 μm and $dn_e/d\nu_l = 10^{-14}$ sec, then compensation occurs for $b = 200$ μm.

Figure 6:
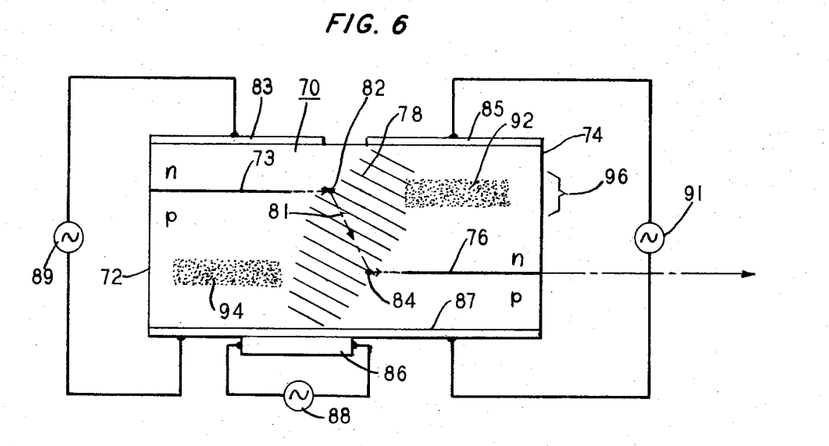
FIG. 6 is a schematic side view of an illustrative embodiment of the invention utilizing an acoustic diffraction grating transverse to the junction planes of a laser diode.
Figure 7:
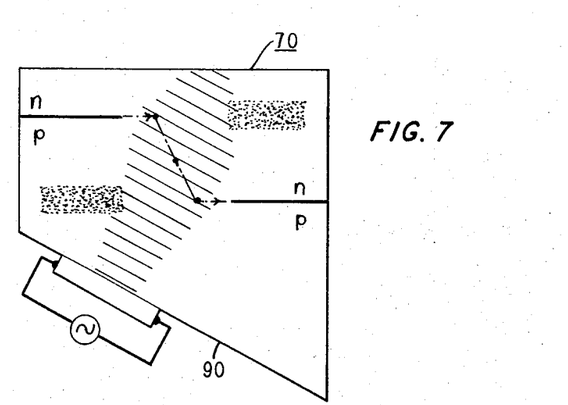
FIG. 7 is a schematic side view of another embodiment of the invention utilizing an acoustic diffraction grating transverse to the junction planes of a laser diode.

Dispersion compensation, and consequently mode locking, utilizing an acoustic diffraction grating is also achieved in the embodiments of FIGS. 6 and 7. There is shown in FIG. 6 a semiconductor active medium 70, such as GaAs having a pair of opposite end faces 72 and 74 cleaved or polished optically flat and parallel to form an optical resonator. Within the medium and normal to the end faces 72 and 74 there are a pair of planar, parallel p-n junctions 73 and 76 spaced from one another in the transverse dimension. In addition, the junctions extend from opposite and parallel end faces 72 and 74, respectively, along only a portion of the longitudinal dimension. In the illustrative embodiment shown, the junctions extend to a point approximately midway between the end faces or mirrors 72 and 74.

When pumped under forward biased conditions by means well known, but not shown for simplicity, optical radiation is generated in the plane of each junction 73 and 76. The radiation in each junction is optically coupled to the other junction by means of an acoustic diffraction grating 78. In a manner similar to the previously described double grating, the acoustic grating causes light from junction 73 to be reflected at 82 along path 81 until it is again reflected at 84 into junction 76 and vice versa.

The acoustic grating may be established as shown in FIG. 6 by means of a transducer 86, such as a ZnO crystal, across which is connected an r.f. source 88. By means well known in the art, the transducer crystal may be fabricated with the appropriate crystallographic angle to produce an acoustic grating which couples the separated junctions. Alternatively, as shown in FIG. 7, a major longitudinal face 90 of medium 70 may be cut at the appropriate angle to produce the aforementioned oblique acoustic grating.

In either case it is advantageous to include loss (shown at 92) by appropriate doping of the n-region in the plane of junction 73 in order to create a favored (lower loss) path containing the junction 76. Since the p-region is inherently a high loss region, the insertion of additional loss as shown as 94 may not be required. Alternatively, the n-region loss may be equivalently accomplished by reducing the reflectivity of end face 74 in the region 96 opposite junction 73.

In either case also mode locking may inherently occur due to the saturable absorption of the medium or may be forced by means of synchronous modulation. In the latter case, as shown in FIG. 6, the laser 70 is provided with a pair of electrically separate contacts 83 and 85 deposited on the top surface of the diode. On the bottom surface is a single contact 87. Between contacts 83 and 87 and between contacts 85 and 87 there are connected respectively, microwave sources 89 and 91 having the frequency of their outputs equal to the longitudinal mode separation frequency of the laser In operation, either of the sources may be utilized to produce mode locking or both may be utilized to produce enhanced mode locking provided, however, that they are driven 180° out of phase with one another.

It is to be understood that the above-described arrangements are merely illustrative of the many possible specific embodiments which can be devised to represent application of the principles of the invention. Numerous and varied other arrangements can be devised in accordance with these principles by those skilled in the art without departing from the spirit and scope of the invention. In particular, the invention may be readily practiced with bulk semiconductors which are generally pumped by an electron beam or by a high-intensity light source (e.g., another laser).

What is claimed is:

1. A mode-locked semiconductor laser comprising, in combination,
   a semiconductor active medium characterized by the property of saturable optical absorption
   an optical cavity resonator including therein said medium,
   means for pumping said medium to generate stimulated coherent radiation in a plurality of longitudinal modes within a range of optical frequencies, said medium being disadvantageously characterized by the dispersive property that radiation at higher frequencies within said range undergoes different time delays than radiation at lower frequencies within said range,
   means for coupling said radiation out of said resonator, and
   multiple-reflection means disposed within said resonator for compensating said dispersive property so that radiation at substantially all frequencies within said range undergoes substantially the same time delay.

2. The laser of claim 1 including means for synchronously modulating the longitudinal modes of said laser.

3. The laser of claim 1 wherein said active medium includes at least one p-n junction characterized by positive dispersion whereby radiation at higher frequencies within said range undergoes longer time delays than radiation at lower frequencies within said range and said multiple-reflection means is characterized by negative dispersion whereby radiation at higher frequencies within said range undergoes shorter time delays than radiation at lower frequencies within said range.

4. The laser of claim 3 wherein said multiple-reflection means comprises at least one Gires-Tournois interferometer.

5. The laser of claim 4 including a second Gires-Tournois interferometer in spaced parallel relation with said one interferometer, said interferometers being obliquely disposed with respect to the axis of said resonator so that radiation undergoes multiple reflections between said interferometers.

6. The laser of claim 4 wherein said interferometer is characterized by a periodic time delay versus frequency characteristic including within each period substantially linear portions having both positive and negative slopes, said interferometer being adapted so that the center frequency of said laser radiation coincides with a substantially linear negative slope portion within one of said periods.

7. The laser of claim 6 wherein said interferometer comprises a first mirror of high reflectivity and a second mirror of intermediate reflectivity in spaced parallel relation with said first mirror, the power reflectivity of said second mirror being approximately 25 percent and wherein said interferometer is constructed to satisfy approximately the following relationship $$\frac{L}{c}\frac{dn_e}{d\nu} = -5\frac{f \sec}{THz}\left(\frac{e}{2.66}\right)^2 T_\nu(e)$$

where $n_e$ is an equivalent index of refraction given
$n_e = n + \nu(dn/d\nu)$
and $\nu$ is the optical center frequency of said laser radiation; $e$ is the optical path length separation said mirrors; $T_\nu(e)$ is a tuning factor varied between about 0.5 and 1.0; $L$ is length of said active medium; and $c$ is the speed of light in a vacuum.

8. The laser of claim 7 wherein said medium includes a high reflectivity first end surface transverse to said junction and a low reflectivity second end surface parallel to said first surface, said first end surface and said first mirror of said interferometer forming said cavity resonator, and said second end surface forming said second mirror of said interferometer.

9. The laser of claim 8 wherein said first mirror is planar and including between said first and second mirrors a lens to match the wavefront of radiation emitted from said junction to said planar first mirror.

10. The laser of claim 8 wherein said first mirror is concave, the curvature thereof substantially matching the wavefront of radiation emitted from said junction.

11. The laser of claim 10 wherein said concave mirror is spherical and of radius equal to the separation between said first mirror and said second mirror.

12. The laser of claim 3 wherein said multiple reflection means comprises a first diffraction grating disposed at an oblique angle with respect to the axis of said resonator, a second diffraction grating, substantially identical to said first diffraction grating, disposed in spaced parallel relation with said first diffraction grating so that said radiation undergoes multiple reflections between said gratings.

13. The laser of claim 12 wherein said diffraction gratings are constructed to satisfy approximately the following relationship $$b = \frac{cL}{\lambda T(\lambda)} \frac{dn_e}{d\nu}$$

where $dn_e/d\nu$ is the dispersion of said active medium, $\nu$ is the optical center frequency of said radiation, $\lambda$ is the wavelength corresponding to $\nu$, $c$ is the speed of light in a vacuum, $b$ is the slant spacing of the gratings, $L$ is the length of said laser medium, $n_e$ is given by $n_e = n + \nu$ $(dn/d\nu)$ where $n$ is the index of refraction of said medium and $T(\lambda)$ is given by $$T(\lambda) = \frac{\left(\frac{\lambda}{d}\right)^2}{\left[1 - \left(\frac{\lambda}{d} - \sin\gamma\right)^2\right]}$$

where $\gamma$ is the angle of incidence between the radiation and the normal to the gratings and $d$ is the ruling spacing of the gratings.

14. The laser of claim 3 wherein
said medium includes first and second planar, parallel p-n junctions in spaced relation to one another in the transverse dimension of said medium and a pair of oppositely facing, parallel end surfaces normal to said junctions thereby defining said resonator, said junctions extending along only a portion of the longitudinal dimension of said medium, said first junction extending from one of said end surfaces and said second junction extending from the other of said end surfaces, and
said multiple reflection means comprises an acoustic diffraction grating established in said medium obliquely to said junction planes so that radiation emitted in the plane of either of said junctions is diffracted to propagate in the plane of the other of said junctions.

15. The laser of claim 14 in combination with optical absorption means disposed to intercept at least radiation emitted into an n-type region of said medium from one of said junctions.

16. The laser of claim 15 wherein said absorption means comprises an absorbing dopant disposed between the end of said one junction and the end surface spaced therefrom.

17. The laser of claim 15 wherein said absorption means is provided by a low reflectivity region on the end surface of said medium spaced from an interior end of said one junction.

18. The laser of claim 15 wherein said multiple reflection means comprises an acoustic transducer crystal contiguous with a major longitudinal surface of said medium, aid crystal having its crystallographic angle cut so that in response to an electric field applied thereacross said acoustic grating is established obliquely to said junctions.

19. The laser of claim 15 wherein said multiple reflection means comprises an acoustic transducer contiguous with a major longitudinal surface of said medium, said major surface being inclined at an angle with respect to said junctions so that in response to an electric field applied across said transducer said acoustic grating is established normal to said major surface and obliquely to said junctions.

20. The laser of claim 3 wherein said laser includes first and second parallel end surfaces transverse to said junction thereby forming said resonator, and including on one major surface thereof a stripe electrical contact in a plane parallel to said junction, said contact comprising first and second parallel segments extending from opposite ones of said end surfaces parallel to the axis of said resonator and along only a portion of the length of said resonator, said first and second segments being separated by a distance $b$, and a third segment extending transverse to said axis thereby forming first and second junctures with said first and second segments, respectively, said third segment forming an angle $2\theta$ with each of said first and second segments, means for establishing at each of said junctures an acoustic grating at an angle $\theta$ to each of said first and second segments, and optical absorption means disposed to intercept radiation emitted into the region of said medium between each of said junctures and the end surface opposite thereto.

21. The laser of claim 20 wherein said acoustic means comprises first and second acoustic transducers contiguous with opposite, parallel longitudinal side surfaces of said medium, said transducers being disposed so that in response to an electric field applied thereto each respectively establishes an acoustic grating at each of said junctures.

22. The laser of claim 20 wherein said laser is constructed to satisfy the following relationships
$$\cos\theta = \nu_s c/2nc_s\nu l$$
and $$\frac{dn_e}{d\nu_l}\left(L + b\,\frac{\cos\theta}{\sin\theta}\right) = \frac{n_e^2 b}{n\nu_l}\,\frac{\cos\theta}{\sin^3\theta}$$

where $n_e$ is an equivalent index of refraction given by $n_e = n + \nu_l\,(dn/d\nu_l)$, $n$ is the index of refraction of said medium, $\nu_l$ is the optical center frequency of said laser radiation, $\nu_s$ is the acoustic frequency, $c$ is the speed of light in a vacuum, $c_s$ is the speed of sound in said medium, and $L$ is the length of said medium.

* * * * *

UNITED STATES PATENT OFFICE
CERTIFICATE OF CORRECTION

Patent No. 3,696,310          Dated October 3, 1972

Inventor(s) Thomas Lee Paoli and Jose Ellis Ripper

It is certified that error appears in the above-identified patent and that said Letters Patent are hereby corrected as shown below:

Column 3, equation (1), change "$\frac{dn_e}{dv_1}$" to --$\frac{dn_e}{dv_\ell}$--.

Column 3, equation (2), change "$(dr/dvn/_\ell)$" to --$\frac{dn}{dv_\ell}$--.

Column 4, line 6, delete minus sign after (.

Column 4, line 8, change "$dn_e/d = 10^{-14}$" to --$dn_e/dv = 10^{-14}$--.

Column 4, equation (4), change "$\frac{L}{c}\frac{dn_e}{dv_1}$" to --$\frac{L}{c}\frac{dn_e}{dv_\ell}$--, change "$Tv(e)$" to --$T_v(e)$--.

Column 5, line 12, "T" should be --$T_v$--.

Column 6, line 28, change "lends" to --lens--.

Column 8, equation (6), change "$\frac{dn_e}{dv_1}$" to --$\frac{dn_e}{dv_\ell}$--, change "$\frac{n_e^2 b}{nv_1}$" to --$\frac{n_e^2 b}{nv_\ell}$--.

UNITED STATES PATENT OFFICE
CERTIFICATE OF CORRECTION

PAGE 2

Patent No. 3,696,310  Dated October 3, 1972

Inventor(s) Thomas Lee Paoli and Jose Ellis Ripper

It is certified that error appears in the above-identified patent and that said Letters Patent are hereby corrected as shown below:

Column 8, line 31, change "10-14" to $--10^{-14}--$.

Column 9, line 22, after laser insert period.

Column 10, claim 7, in equation, change "$T\nu(e)$" to $--T_\nu(e)--$.

Column 11, line 12, delete parenthesis before "$dn/d\nu$".

Column 12, claim 22, line 3, change "$\cos\theta = \nu_s c/2nc_s \nu 1$" to $--\cos\theta = \nu_s c/2nc_s \nu_\ell --$.

Column 12, claim 22, line 5, change "$\frac{dn_e}{d\nu_1}$" to $--\frac{dn_e}{d\nu_\ell}--$, change "$\frac{n_e^2 b}{n\nu_1}$" to $--\frac{n_e^2 b}{n\nu_\ell}--$.

Signed and sealed this 13th day of March 1973.

(SEAL)
Attest:

EDWARD M. FLETCHER, JR.
Attesting Officer

ROBERT GOTTSCHALK
Commissioner of Patents